United States Patent
Groza et al.

(10) Patent No.: US 7,393,559 B2
(45) Date of Patent: Jul. 1, 2008

(54) METHODS FOR PRODUCTION OF FGM NET SHAPED BODY FOR VARIOUS APPLICATIONS

(75) Inventors: Joanna R Groza, Carmichael, CA (US); Vladimir Kodash, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 477 days.

(21) Appl. No.: 11/049,335

(22) Filed: Feb. 1, 2005

(65) Prior Publication Data
US 2006/0172073 A1 Aug. 3, 2006

(51) Int. Cl.
*B05D 1/12* (2006.01)

(52) U.S. Cl. ............... 427/192; 427/191; 427/383.1

(58) Field of Classification Search ............ 427/191, 427/192, 383.1
See application file for complete search history.

(56) References Cited

U.S. PATENT DOCUMENTS

| | | | |
|---|---|---|---|
| 5,302,414 A * | 4/1994 | Alkhimov et al. | ........... 427/192 |
| 5,380,409 A | 1/1995 | Munir et al. | |
| 5,455,000 A | 10/1995 | Seyferth et al. | |
| 5,599,468 A | 2/1997 | Mako et al. | |
| 5,980,998 A | 11/1999 | Sharma et al. | |
| 6,136,452 A | 10/2000 | Munir et al. | |
| 6,384,365 B1 * | 5/2002 | Seth et al. | ............... 219/76.13 |
| 6,519,500 B1 | 2/2003 | White | |
| 2004/0043230 A1 | 3/2004 | Hatono et al. | |
| 2004/0180776 A1 * | 9/2004 | Brandt | ........................ 501/89 |
| 2006/0015187 A1 * | 1/2006 | Hunter et al. | .............. 623/23.5 |

OTHER PUBLICATIONS

Cold Spraying- A Study of Process and Coating Characteristics, Proceedings of the International Thermal Spraying Conf., Nov. 2000, Kreye et al, pp. 419-422.*
PCT International Search Report and Written Opinion, PCT/US06/02300, Aug. 7, 2007, 8 pages.

* cited by examiner

*Primary Examiner*—Frederick J Parker
(74) *Attorney, Agent, or Firm*—Fenwick & West LLP

(57) ABSTRACT

Methods for the production of functionally graded material (FGM) are provided. FGM is processed by powder cold spraying ceramic-metal layers, the final shape is pre-pressed by cold isostatic pressing and is then sintered using field activated sintering technique (FAST). The FGM materials can be used for medical applications.

28 Claims, No Drawings

METHODS FOR PRODUCTION OF FGM NET SHAPED BODY FOR VARIOUS APPLICATIONS

GOVERNMENT INTEREST

This invention was made with support of Government under Grant No. DMI-0400352, awarded by the National Science Foundation. Therefore, the United States government may have certain rights in the invention.

FIELD OF INVENTION

The invention described herein relates to functionally graded materials and methods for their production, more particularly by cold spray processing and sintering using the field activated sintering technique.

BACKGROUND

A functionally gradient material (FGM) is an anisotropic composite material and can be a metal-ceramic material. A gradient in composition and/or microstructure is deliberately introduced into the material which results in a gradient in composite properties. Depending upon the application of the FGM, the gradient can be created in a continuous or stepwise fashion. FGMs find use in aerospace applications, in microelectronics, and in medical applications.

FGMs can be prepared by chemical or physical vapor deposition (CVD/PVD), conventional powder metallurgy processing, plasma spraying or Self Propagating High Temperature Synthesis (SHS). However, these methods are not ideal. For example, conventional powder metallurgy processing involves consolidation processes that typically require binders, such as organic binders, which must be removed during some point of the process, usually by heating of the green composite before sintering. Thermolysis of the binders generates volatile byproducts, removal of which can be costly and must be accomplished in a carefully controlled manner if cracking, deformation or bloating of the part is to be avoided. Also, shrinkage of individual layers can occur, especially when top and bottom layers have large differences in density.

FGMs can also be prepared by the gelcasting method. For example, U.S. Pat. No. 6,375,877 to Lauf et al. discloses suspending two different phases into a mold, thereby creating a compositional gradation within the object, and the slurries are then gelled. The individual slurries are selected such that they have comparable sinterability so that uniform shrinkage occurs during sintering. Thus, the method is not widely applicable. In another method, disclosed in U.S. Pat. No. 6,776, 860 to Arai et al., two ceramic composites are bonded together by dispersing a bonding ceramic between them and then sintering to the desired porosity.

Thus, there exists a need for methods for the production of functionally gradient material which avoids the use of those types of binders, which, when removed by thermolysis, generate volatile byproducts whose removal is relatively costly and often results in degradation of the properties of the material being formed. This method should also provide a means for controlling shrinkage of functionally gradient material during processing.

Recently, Cold Spray Process (CSP) (U.S. Pat. No. 5,302, 414 to Alkhimov et al. (1994), McCune et al. "An Exploration of the Cold Gas-Dynamic Spray Method for Several Materials Systems," J. Thermal Spray Science and Technology, C. C. Berndt and S. Sampath, Ed., ASM International, 1995, pp. 1-5, and Dykhuizen et al. "Gas Dynamic Principles of Cold Spray", J. Thermal Spray Tech., 7:205 (1998)) has been used for the deposition of coatings and for the production of FGMs. CSP uses a supersonic gas jet (velocity of 5000 km/h) to accelerate solid fine powders (micron size) of various materials above a critical velocity at which particles impact, deform plastically and bond to the substrate to form the coating. CSP does not use plasma, combustion processes or any other thermal source, therefore, the spray environment is very clean and the material is not exposed to high temperatures. The present invention discloses the use of CSP for forming the shaped bodies and the use of Field Assisted Sintering Technique (FAST) for sintering the body.

SUMMARY

The present invention provides methods for the synthesis of functionally gradient material (FGM). The compositions thus synthesized find use in the defense industry, aerospace industry, electronics industry, and in medical applications.

The methods can be used to create FGMs of a wide variety of materials, e.g., pure metals and/or alloys. Examples of pure metals that can be used with the methods of the invention include, e.g., aluminum (Al), nickel (Ni), copper (Cu), and titanium (Ti). Examples of alloys that can be used with the methods of the invention include, e.g., aluminum alloy systems, nickel alloy systems, superalloys, Ni—Ti—C systems, W—C—Co systems, and MCrAlY systems, wherein M is Ni, Co, and/or Fe.

The methods can be used to create FGMs of composite materials, e.g., a metallic matrix combined with a ceramic or a secondary phase reinforcement. The metallic matrix can be, e.g., a pure metal or an alloy such as those described in the preceding paragraph. The ceramic can be, e.g., oxides, nitrides, and/or carbides, e.g., silicon carbide (SiC), aluminum oxide ($Al_2O_3$), boron carbide ($B_4C$), and/or aluminum nitride (AlN).

In one aspect, the invention provides methods for producing functionally graded materials comprising depositing at least one layer of a material on a substrate using a cold spray process to provide a green body; and consolidating the green body using field activated sintering technique (FAST). The material can be metal powder such as Al, Be, Ca, Sr, Ba, Sc, V, Cr, Mn, Fe, Co, Ni, Cu, Zn, Y, Nb, Mo, Tc, Ru, Rh, Pd, Ag, Cd, W, or combinations thereof, or can be an alloy selected from the group consisting of aluminum alloy systems, nickel alloy systems, superalloys, Ni—Ti—C systems, W—C—Co systems, and MCrAlY systems, wherein M is Ni, Co, and/or Fe, or a combination of any of a metal, an alloy and a ceramic. The ceramic can be oxides, carbides, nitrides, or borides. The substrate can be, e.g., boron carbide, silicon carbide, aluminum nitride, or aluminum oxide.

In another aspect, the invention provides methods for producing functionally graded materials comprising depositing a first layer of a material on a non-flat substrate using a cold spray process to provide a green body and a last layer of a metal, wherein the substrate comprises a ceramic, and the first layer comprises the ceramic and a metal, and consolidating the green body using field activated sintering technique (FAST). The metal can be Al, Be, Ca, Sr, Ba, Sc, V, Cr, Mn, Fe, Co, Ni, Cu, Zn, Y, Nb, Mo, Tc, Ru, Rh, Pd, Ag, Cd, W, or combinations thereof, or can be an alloy selected from the group consisting of aluminum alloy systems, nickel alloy systems, superalloys, Ni—Ti—C systems, W—C—Co systems, and MCrAlY systems, wherein M is Ni, Co, and/or Fe, or a combination of a metal, an alloy and a ceramic. The ceramic can be oxides, carbides, nitrides, or borides. Thus, the ceramic can be boron carbide, silicon carbide, aluminum nitride, or aluminum oxide.

These and other aspects of the present invention will become evident upon reference to the following detailed description. In addition, various references are set forth herein which describe in more detail certain procedures or compositions, and are therefore incorporated by reference in their entirety.

DETAILED DESCRIPTION

I. Definitions

Unless otherwise stated, the following terms used in this application, including the specification and claims, have the definitions given below. It must be noted that, as used in the specification and the appended claims, the singular forms "a," "an" and "the" include plural referents unless the context clearly dictates otherwise. The practice of the present invention will employ, unless otherwise indicated, conventional methods of material science and physical chemistry, within the skill of the art. Such techniques are explained fully in the literature. See, e.g., Lü L, Lai M O. Mechanical Alloying, Kluwer Academic Publishers, 1998, Boston, Mass.; Suryanarayana C. Progr Mater Sci 2001; 46: 1-184; Xie G Q, Ohashi O, Yoshioka T, Song M H, Mitsuishi K, Yasuda H, Furuya K, Noda T MATERIALS TRANSACTIONS, 42 (9): 1846-1849 September 2001; and Cabanas-Moreno J G, Calderon H A, Umemoto M, ADVANCED STRUCTURAL MATERIALS SCIENCE FORUM, 442: 133-142 2003.

All publications, patents and patent applications cited herein, whether supra or infra, are hereby incorporated by reference in their entirety.

As used herein, the term "powder" or "particle" are used interchangeably and encompass oxides, carbides, nitrides, borides, chalcogenides, halides, metals, intermetallics, ceramics, polymers, alloys, and combinations thereof. The term includes single metal, multi-metal, and complex compositions. Further, the terms include one-dimensional materials (fibers, tubes), two-dimensional materials (platelets, films, laminates, planar), and three-dimensional materials (spheres, cones, ovals, cylindrical, cubes, monoclinic, parallelepipeds, dumbbells, hexagonal, truncated dodecahedron, irregular shaped structures, and the like).

As used herein, the term "alloy" describes a solid comprising two or more elements, such as aluminum and a second metal selected from magnesium, lithium, silicon, titanium, and zirconium. In addition, the alloy may contain metals such as Be, Ca, Sr, Ba, Ra, Sc, V, Cr, Mn, Fe, Co, Ni, Cu, Zn, Y, Nb, Mo, Tc, Ru, Rh, Pd, Ag, Cd, W, or combinations thereof.

As used herein, "support" refers to a surface such as a plastic plate, glass plate, nylon, silicon, silicon oxide, silicon dioxide, mica, quartz, porous material matrix and the like.

II. Modes of Carrying Out the Invention

Disclosed herein is the use of cold spray technology and field activated sintering to produce functionally gradient material (FGM) having ceramic, metal, and/or ceramic-metal layered structure. The shaped body can be preformed by cold spraying or by slip casting mixtures of ceramic-metal powders, where the concentration of the ceramic and metal components can be graded from one layer to the other layer. The shaped body thus formed, also called green body, can be consolidated using field activated sintering technique (FAST) to produce full or near-full densification or porous material.

The inventive methods thus produce FGMs in short processing times and eliminate machining operations, thereby reducing the cost of producing FGMs. The shaped bodies produced by the methods and processes disclosed herein exhibit interlayer bonding between the ceramic and the metal that is better than other methods. Further, the shaped bodies produced by the inventive methods have reduced grain growth, and improved mechanical properties and durability of the product.

The invention is useful for applications where structural alloys or composites are used, e.g., medical applications, military crafts, space/aerospace, and the automotive industries. For example, the invention can be used to produce biocompatible shaped bodies, such as cap bone prosthesis for use as an artificial bone joint replacement, for bone replacement, for dentistry, and the like. Thus, the shaped body can have any convenient shape, e.g., circular, rectangular, elliptical, wedge-shaped, flat or any curved shaped. The cold spray process does not use plasma, combustion processes or any other thermal source. Therefore the spray environment is very clean and the material is not exposed to high temperatures. Therefore, the FGMs produced retain their grain size.

Metals

The metals for use in the present invention can be any metal, metal matrix composite, and intermetallic. The metal can be a transition metal such as Sc, Ti, V, Cr, Mn, Fe, Co, Ni, Cu, Zn, Y, Zr, Nb, Mo, Tc, Ru, Rh, Pd, Ag, Cd, La, Hf, Ta, W, Re, Os, Ir, Pt, Au, or Hg or mixtures thereof. The metal can be an f-orbital inner transition metal such as Ce, Pr, Nd, Pm, Sm, Eu, Gd, Tb, Dy, Ho, Er, Tm, Yb, Lu, Th or U or mixtures thereof. The metal can be a main group metal such as Al, Pb, Sn, Bi or Sb or mixtures thereof, or the lanthanides, such as Ce, Eu, Er, or Yb and mixtures thereof. The metal can also be a metalloid such as B, C, Si or Ge or mixtures thereof. Carbon can be in an amorphous, graphite, diamond, or carbon nanotube form.

Specific examples of mixtures of metals, such as bimetallics, which may be employed by the present invention include Fe—Al, Al—Mg, Co—Cr, Co—W, Co—Mo, Ni—Cr, Ni—W, Ni—Mo, Ru—Cr, Ru—W, Ru—Mo, Rh—Cr, Rh—W, Rh—Mo, Pd—Cr, Pd—W, Pd—Mo, Ir—Cr, Ir—W, Pt—W, and Pt—Mo. Preferably, the metal is aluminum, iron, cobalt, nickel, titanium, copper, molybdenum, or a mixture thereof.

In one aspect, the metal powder to be processed is pre-alloyed powder that can be used directly in the cold spray process of the cryomilling process. In another aspect, the powder to be processed is non-alloyed powder wherein two or more different metal powders are added to the cryomill, and the cryomilling process is used to mix together the metal constituents thereby alloying the metals.

Examples of metals include, but are not limited to, (a) precious metals such as platinum, palladium, gold, silver, rhodium, ruthenium and their alloys; (b) base and rare earth metals such as iron, nickel, manganese, cobalt, aluminum, copper, zinc, titanium, samarium, cerium, europium, erbium, and neodymium; (c) semi-metals such as boron, silicon, tin, indium, selenium, tellurium, and bismuth; (d) non-metals such as carbon, phosphorus, and halogens; and (e) alloys such as steel, shape memory alloys, aluminum alloys, manganese alloys, and superplastic alloys.

In the practice of the methods, the starting metals are preferably manipulated in a substantially oxygen free atmosphere. For example, if the metal is aluminum, the aluminum is preferably supplied by atomizing the aluminum from an aluminum source and collecting and storing the atomized aluminum in a container under an argon or nitrogen atmosphere. The inert atmosphere prevents the surface of the aluminum particles from excessive oxidation and prevents contaminants such as moisture from reacting with the raw metal powder. Preferably, other metals that can readily oxidize are treated in the same manner as aluminum prior to milling.

In one aspect, the invention uses metalloid carbon in the form of carbon nanotubes. Carbon nanotubes are hexagonal networks of carbon atoms forming seamless tubes with each end capped with half of a fullerene molecule. The carbon nanotubes can be multi-layer concentric tubes or multi-walled carbon nanotubes or single-walled carbon nanotubes. The carbon nanotubes can be obtained from commercial sources or they can be synthesized by any one of known methods for the synthesis of single- and multi-walled carbon nanotubes. These methods include the electric arc discharge of graphite rod (Journet et al. Nature 388: 756 (1997)), the laser ablation of carbon (Thess et al. Science 273: 483 (1996)), and the chemical vapor deposition of hydrocarbons (Ivanov et al. Chem. Phys. Lett 223: 329 (1994); Li et al. Science 274: 1701 (1996)). Multi-walled carbon nanotubes can be produced on a commercial scale by catalytic hydrocarbon cracking while single-walled carbon nanotubes are normally produced on a gram scale using chemical vapor deposition methods.

The metal, metalloid, or intermetallic can be mixed with a reinforcement, also called ceramic composition (oxide, carbide, nitride, boride, chalcogenide), or an intermetallic composition (aluminide, silicide) or an elemental composition. Examples of ceramic composition include, but are not limited to (a) simple oxides such as aluminum oxide, silicon oxide, zirconium oxide, cerium oxide, yttrium oxide, bismuth oxide, titanium oxide, iron oxide, nickel oxide, zinc oxide, molybdenum oxide, manganese oxide, magnesium oxide, calcium oxide, and tin oxide; (b) multi-metal oxides such as aluminum silicon oxide, copper zinc oxide, nickel iron oxide, magnesium aluminum oxide, calcium aluminum oxide, calcium aluminum silicon oxide, indium tin oxide, yttrium zirconium oxide, calcium cerium oxide, scandium yttrium zirconium oxide, barium titanium oxide, barium iron oxide and silver copper zinc oxide; (c) carbides such as silicon carbide (SiC), boron carbide, iron carbide, titanium carbide, zirconium carbide, hafnium carbide, molybdenum carbide, and vanadium carbide; (d) nitrides such as silicon nitride ($Si_3N_4$), boron nitride, iron nitride, titanium nitride, zirconium nitride, hafnium nitride, molybdenum nitride, and vanadium nitride; (e) borides such as silicon boride, iron boride, titanium diboride, zirconium boride, hafnium boride, molybdenum boride, and vanadium boride; and (f) complex ceramics such as titanium carbonitride, titanium silicon carbide, zirconium carbonitride, zirconium carboxide, titanium oxynitride, molybdenum oxynitride, and molybdenum carbonitride. Preferably, the ceramic is silicon carbide (SiC), silicon nitride ($Si_3N_4$), silicon carbonitride, silicon oxycarbide, silicon oxynitride boron carbide ($B_4C$), boron nitride (BN), silicon boride ($B_4Si$), aluminum boride (AlB), titanium carbide (TiC), zirconium carbide (ZrC), titanium boride ($TiB_2$), silica ($SiO_2$), zirconia ($ZrO_2$) and alumina ($Al_2O_3$). The method can also be used with transition metal silicide ceramics and diamond.

Optionally, binders can be used in the method of the invention. The binder can be selected such that it is chemically compatible with the powder with which it is to be combined to form a layer or layers of the functionally gradient material.

In another aspect, the starting metal powders can be mixed with some compounds other than ceramics. Such compounds may include, for instance, organometallic compounds such as metal alkoxides, as well as nitrates, carbonates, sulfates, and hydroxides. These may be in the form of a powder or a liquid.

In the case of preparing a mixture containing ceramic and metals or alloys in obtaining the sintered compact according to the present invention, there is no particular limitation on the molar equivalents for the ceramic to be added. However, the molar ratio of metals to added ceramic reinforcement is preferably 1000:1 to about 1:1, preferably about 500:1 to about 5:1, and more preferably about 100:1 to about 10:1.

Cold Spray Process

The Cold Spray Process (CSP, or Hyperkinetic Spray Technique) represents a solution to the challenges of near-net shape spray forming of FGMs. CSP uses a supersonic gas jet to accelerate aqueous solutions of the various materials or solid fine powders (micron size) of various materials above a critical velocity at which particles impact, deform plastically and bond to the substrate to form the coating. The cold spray process (CSP) can be used to spray the metals disclosed above, such as zinc, copper, aluminum, titanium, and nickel on various substrates such as tin, copper, aluminum alloys, brass, glass and steel, and the like.

As opposed to other spraying processes, the Cold Spray Process does not involve a major heating of the carrier fluid and the driven solid particles. Although a heater is often used to pre-heat the carrier gas to temperatures near 600° C. to maximize the jet velocity, the gas rapidly cools to room temperature inside the nozzle due to the quick conversion of thermal to kinetic energy. Furthermore, it is possible to circumvent the use of a heater by using a gas with low molecular weight such as helium. Consequently, the injected particles are never in contact with high temperature gas. As a result, the particles maintain solid form close to or below room temperature throughout their flight, from the injection location to the substrate. Accordingly, Cold Spray is often referred to as a solid-state process in which high temperature transformations such as oxidation and melting are minimized, and represents a major advantage over all the other existing spraying techniques. Thus, it is possible to avoid grain growth during cold spray deposition, and since the particles are not heated/melted during their flight, it becomes possible to recycle the non-deposited particles; this represents a major economic benefit over all other spraying techniques.

The material to be deposited on the substrate can be injected in a supersonic gas jet to be accelerated above the critical velocity. A high-pressure gas can be forced to flow through a de Laval (converging/diverging) nozzle, generating the high-speed jet. A commercial powder feeder (Praxair-Model 1264) can be used to inject the particles in the nozzle. The heater can be made of a stainless steel tube connected to a power supply. By activating the power supply, the tube acts as an electrical resistance and heats up. The gas is forced through the tube and heats up by convection. It is possible to operate the system without the heater. The substrate (the piece to be coated) is mounted on a motorized plate. The equipment can be obtained from commercial suppliers, such as from ABS Industries, Inc. Ohio.

Consolidation

The shaped body can be consolidated by hot pressing (HP), hot isostatic pressing (HIP), cold isostatic pressing (CIP), spark plasma sintering (SPS), or by field activated sintering technique (FAST). The consolidation is preferably by SPS or FAST. FAST involves the imposition of an electrical field during sintering. SPS is one of the widely used FAST techniques.

The shaped body can be consolidated by FAST. FAST consists of two stages: (1) an initial activation through the application of a pulsed current; (2) a resistance heating step.

The pulsed discharge can be achieved by the application of an on/off low voltage (~30 V) and high current (>600 A). The duration of each pulse can be varied between 1 ms and 300 ms, preferably between 1 ms and 200 ms, more preferably between 2 ms and 30 ms. The subsequent step comprises the application of a DC current at a level dependent on the powder type. The pulsed and direct current may be applied simultaneously or sequentially. The pulses can be applied throughout the sintering cycle, such as in SPS, or only prior to the application of a steady DC current. The wave forms can be square, sinusoidal, seesaw, or continuous. Pressure can be applied at a constant or variable level throughout the process. The entire operation, from loading in the die to the ejection of the finished part, can be accomplished in less than 10 minutes.

The FAST system can be commercially obtained, such as Dr. Sinter 1050 apparatus (Sumitomo Coal Mining Co., Japan). Typically in FAST, a graphite die with an inner diameter of about 20 mm to about 100 mm is used. The larger inner diameter is selected for the fabrication of large pieces of bulk materials. The uniaxial pressure for FAST can be applied by the top and bottom graphite punches thereby eliminating the need for high-pressure argon. Typically, the alloy is degassed to remove the gaseous materials, including stearic acid, but is not required. The removal of gaseous components is preferably carried out at a temperature between about 200° C. and 600° C., more preferably at a temperature between about 300° C. and 500° C. Then, the shaped body in the FAST system is heated at a rate of about 10-500° C./min and held at the sintering temperature for about 1 min to about 60 min, preferably about 2 min to about 15 min. The sintering temperature is carried out at a temperature between about 40% and 100% of the absolute melting temperature of the metal phase, preferably between about 60% and about 95% of the absolute melting temperature of the metal phase, more preferably about 80% and about 95% of the absolute melting temperature of the metal phase.

Optionally, during sintering, powder beds can be included. The powder beds can serve as the media for transmission of the applied load from the punches to the body. The powder is selected such that it does not melt at the sintering temperature and flows easily at the high temperatures. The powder beds can be boron nitride (BN), $Si_3N_4$, MgO, or $Al_2O_3$. The powder beds can have additives such $Y_2O_3$ to influence the weight change and phase formation of the samples.

Typically, the ceramic body can be produced by first preparing a starting material ceramic powder using a wet or dry process. Subsequently, the starting material ceramic powder can be pressurized by means of a mold press, rubber press or the like to form a compacted body having a predetermined shape, such as, for example, artificial dental implants or bone replacement materials. Thus formed compacted or shaped body can then be sintered at a specific temperature to obtain a dense ceramic body.

The shaped body can be consolidated using FAST to about 80% density, preferably about 90% density, more preferably about 95% density. However, depending on the use of the FGM, the shaped body can have a porosity of 15 to 70%, and preferably 30 to 55%. For example, a FGM shaped body for use as a bone replacement can have a porosity of about 35% to about 45%.

EXAMPLES

Below are examples of specific embodiments for carrying out the present invention. The examples are offered for illustrative purposes only, and are not intended to limit the scope of the present invention in any way. Efforts have been made to ensure accuracy with respect to numbers used (e.g., amounts, temperatures, etc.), but some experimental error and deviation should, of course, be allowed for.

X-ray diffraction (XRD) measurements can be carried out with a Scintag XDS-2000 diffractometer equipped with a graphite monochromator using Cu $K_\alpha$ radiation. TEM studies can be performed using a Philips CM-12 microscope operated at 120 kV. Vickers microhardness tests can be performed on the cross-section of the deposits using 300 gf of load and a dwell time of 15 s.

Example 1

Formation of Ceramic-metal FGM Shaped Body

Powder mixes were prepared having $Al_2O_3$:Ti in the ratio of 1:3 (v/v), 1:1 (v/v) and 3:1 (v/v). The Baikalox $Al_2O_3$ ceramic was obtained from Baikowski International Corporation and had an average particle size of 300 nm. The powder mixes were placed in separate plastic bottles, and mixed for 24 h using alumina balls. The dry mixtures of powders, $Al_2O_3$, and Ti were each suspended in water to give slurries. The slurries were sprayed using the cold spray process onto a graphite semi-cup shaped template in the following sequence: 100% $Al_2O_3$, 75% $Al_2O_3$: 25% Ti, 50% $Al_2O_3$: 50% Ti, 25% $Al_2O_3$: 75% Ti, and 100% Ti. The cold spray was carried using a simple spray bottle; however, this process can also be done using any commercially available coating equipment. The body was dried for 2-3 h at 30-40° C. before the next layer was deposited. After the last layer was deposited, the body was dried at 30-40° C., and then placed into a rubber capsule and cold isostatically pressed at 150 MPa. The preformed body thus formed was placed into a graphite die with boron nitride (BN) powder bed.

Example 2

Field Assisted Sintering

The preformed body in a graphite die with BN powder was placed into the spark plasma sintering (SPS) machine (Dr. Sinter SPS-511S, Sumitomo Heavy Industries, Japan) for field assisted sintering. The sintering was conducted under vacuum, with the pressure maintained between 3 and 10 Pa. The temperature was measured using a pyrometer at the wall surface of the die.

The temperature was increased from 20° C. to 600° C. in 5 min, and then from 600° C. to 1250° C. in 3 min. to 10 min. while the pressure applied to the preformed body was at 10 MPa. The temperature at 1250° C. was maintained for 5 min., while the pressure applied was increased to 60 MPa, and the electrical pulsing parameter for the rectangular wave form was 36 ms for on-time and 6 ms for Off-time with a voltage range of 0-5 V and the current rate of 0-4500 A. The temperature was then lowered to 600° C. over a 15 min. period, and the apparatus was then shut down. The die was allowed to cool to 20° C., and the semi cup was recovered from the die. The resulting FGM with multi layered ceramic-metal graded structure had strong bonding between the layers.

While the invention has been particularly shown and described with reference to a preferred embodiment and various alternate embodiments, it will be understood by persons skilled in the relevant art that various changes in form and details can be made therein without departing from the spirit and scope of the invention. All printed patents and publications referred to in this application are hereby incorporated herein in their entirety by this reference.

We claim:

1. A method for producing functionally graded materials, the method comprising:
   depositing at least one layer of a material on a non-flat substrate using a cold spray process to provide a green body;
   placing the green body in a boron nitride powder bed; and
   consolidating the green body in the boron nitride powder bed using a field activated sintering technique (FAST).

2. The method of claim 1, wherein the material is a pure metal.

3. The method of claim 2, wherein the metal is selected from the group consisting of Al, Be, Ca, Sr, Ba, Ra, Sc, V, Cr, Mn, Fe, Co, Ni, Cu, Zn, Y, Nb, Mo, Tc, Ru, Rh, Pd, Ag, Cd, and W, or combinations thereof.

4. The method of claim 3, wherein the metal is selected from the group consisting of aluminum (Al), nickel (Ni), copper (Cu), and titanium (Ti).

5. The method of claim 1, wherein the material is an alloy.

6. The method of claim 5, wherein the alloy is selected from the group consisting of aluminum alloy systems, nickel alloy systems, superalloys, Ni—Ti—C systems, W—C—Co systems, and MCrAlY systems, wherein M is Ni, Co, and/or Fe.

7. The method of claim 1, wherein the substrate comprises one or more compounds selected from the group consisting of ceramic, steel, steel alloys, aluminum, aluminum alloys, nickel, nickel alloys, superalloys, copper, silver, gold, and titanium.

8. The method of claim 7, wherein the ceramic is selected from the group consisting of oxides, nitrides, and carbides.

9. The method of claim 8, wherein the ceramic is selected from the group consisting of silicon carbide (SiC), aluminum oxide ($Al_2O_3$), boron carbide ($B_4C$), and aluminum nitride (AlN).

10. The method of claim 1, wherein the substrate is boron carbide.

11. The method of claim 1, wherein the substrate is silicon carbide.

12. The method of claim 1, wherein the substrate is aluminum nitride.

13. The method of claim 1, wherein the substrate is aluminum oxide.

14. The method of claim 1, wherein the substrate is curved.

15. The method of claim 1, wherein at least 3 layers are deposited.

16. The method of claim 15, wherein 2 of the layers comprise a mixture of ceramic and metal and 1 of the layers comprises metal.

17. The method of claim 16, wherein the metal layer is deposited last.

18. A method for producing functionally graded materials, the method comprising:
   depositing a first layer of a material on a non-flat substrate using a cold spray process to provide a green body and a last layer of a metal, wherein the substrate comprises a ceramic, and the first layer comprises the ceramic and a metal;
   placing the green body in a boron nitride powder bed; and
   consolidating the green body in the boron nitride powder bed using a field activated sintering technique (FAST).

19. The method of claim 18, wherein the metal is selected from the group consisting of Al, Be, Ca, Sr, Ba, Ra, Sc, V, Cr, Mn, Fe, Co, Ni, Cu, Zn, Y, Nb, Mo, Tc, Ru, Rh, Pd, Ag, Cd, and W, or combinations thereof.

20. The method of claim 19, wherein the metal is selected from the group consisting of aluminum (Al), nickel (Ni), copper (Cu), and titanium (Ti).

21. The method of claim 18, wherein the substrate is boron carbide.

22. The method of claim 18, wherein the substrate is silicon carbide.

23. The method of claim 18, wherein the substrate is aluminum nitride.

24. The method of claim 18, wherein the substrate is aluminum oxide.

25. The method of claim 18, wherein the non-flat substrate is in the shape of a joint.

26. The method of claim 18, wherein the non-flat substrate is in the shape of a tooth.

27. The method of claim 18, wherein the non-flat substrate is in the shape of a bone.

28. The method of claim 18, wherein the non-flat substrate is in the shape of vertebrae.

* * * * *